(12) United States Patent
Branch

(10) Patent No.: US 10,368,693 B2
(45) Date of Patent: Aug. 6, 2019

(54) FOOD TOASTING DEVICE

(71) Applicant: Willard Branch, Lyons, OR (US)

(72) Inventor: Willard Branch, Lyons, OR (US)

( * ) Notice: Subject to any disclaimer, the term of this patent is extended or adjusted under 35 U.S.C. 154(b) by 203 days.

(21) Appl. No.: 15/442,159

(22) Filed: Feb. 24, 2017

(65) Prior Publication Data

US 2018/0242788 A1    Aug. 30, 2018

(51) Int. Cl.
*A47J 37/08* (2006.01)

(52) U.S. Cl.
CPC .............. *A47J 37/08* (2013.01); *A47J 37/085* (2013.01); *A47J 37/0807* (2013.01); *A47J 37/0857* (2013.01)

(58) Field of Classification Search
CPC .... A47J 37/08; A47J 37/0807; A47J 37/0857; A47J 37/0864; A47J 37/085
USPC ......... 99/329 RT, 329 P, 385, 389, 391, 392, 99/393, 400
See application file for complete search history.

(56) References Cited

U.S. PATENT DOCUMENTS

| | | | |
|---|---|---|---|
| 4,368,379 A | 1/1983 | Swanson | |
| 4,397,227 A | 8/1983 | Landry | |
| 4,972,767 A | 11/1990 | Russell et al. | |
| 5,054,382 A * | 10/1991 | Ward | A47J 37/08 99/327 |
| 5,193,439 A | 3/1993 | Finesman et al. | |
| 5,642,657 A | 7/1997 | Yeung et al. | |
| 5,901,638 A | 5/1999 | Houel | |
| 6,051,818 A | 4/2000 | Van Der Wal et al. | |
| 6,205,910 B1 * | 3/2001 | Vaughn | A47J 37/08 219/521 |
| 6,311,608 B1 | 11/2001 | Hardin et al. | |
| 6,686,564 B2 | 2/2004 | Zhou | |
| 2004/0262288 A1 * | 12/2004 | Kim | A47J 37/0676 219/451.1 |
| 2006/0201338 A1 | 9/2006 | Levinson | |
| 2008/0279998 A1 * | 11/2008 | Park | A47J 37/085 426/466 |
| 2015/0114237 A1 * | 4/2015 | Abukashef | A47J 37/08 99/393 |
| 2015/0257597 A1 * | 9/2015 | Marschke | A47J 37/08 99/389 |

FOREIGN PATENT DOCUMENTS

DE    4408491 A1 *  9/1995  ............. A47J 37/08

* cited by examiner

*Primary Examiner* — Reginald Alexander

(57) ABSTRACT

A food toasting device for selectively heating occupied toasting slots includes a housing. A plurality of walls, which are coupled to the housing, define a plurality of chambers. A plurality of slots is positioned in a top of the housing. A power module is coupled to the housing. Each of a plurality of heating elements is selectively couplable to the power module and is positioned on a respective opposing side of an associated chamber. Each of a plurality of lifts is coupled to the housing and positioned in an associated chamber. The lifts are spring loaded and are configured to operate independently. Each slot is configured to insert a food item, such as a piece of bread, into an associated chamber. The lift is configured to lower the food item into the associated chamber. The heating elements are configured to toast the food item.

10 Claims, 4 Drawing Sheets

FOOD TOASTING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to food toasting devices and more particularly pertains to a new food toasting device for selectively heating occupied toasting slots.

BRIEF SUMMARY OF THE INVENTION

An embodiment of the disclosure meets the needs presented above by generally comprising a housing that defines an internal space. A plurality of walls, which are coupled to the housing and positioned in the internal space, define a plurality of chambers. A plurality of slots is positioned in a top of the housing. A power module is coupled to the housing and is positioned in the internal space. Each of a plurality of heating elements is selectively couplable to the power module and is positioned on a respective opposing side of an associated chamber. Each of a plurality of lifts is coupled to the housing and positioned in an associated chamber. The lifts are spring loaded and are configured to operate independently. Each slot is configured to insert a food item, such as a piece of bread, into an associated chamber. The lift is configured to lower the food item into the associated chamber. The heating elements are configured to toast the food item.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
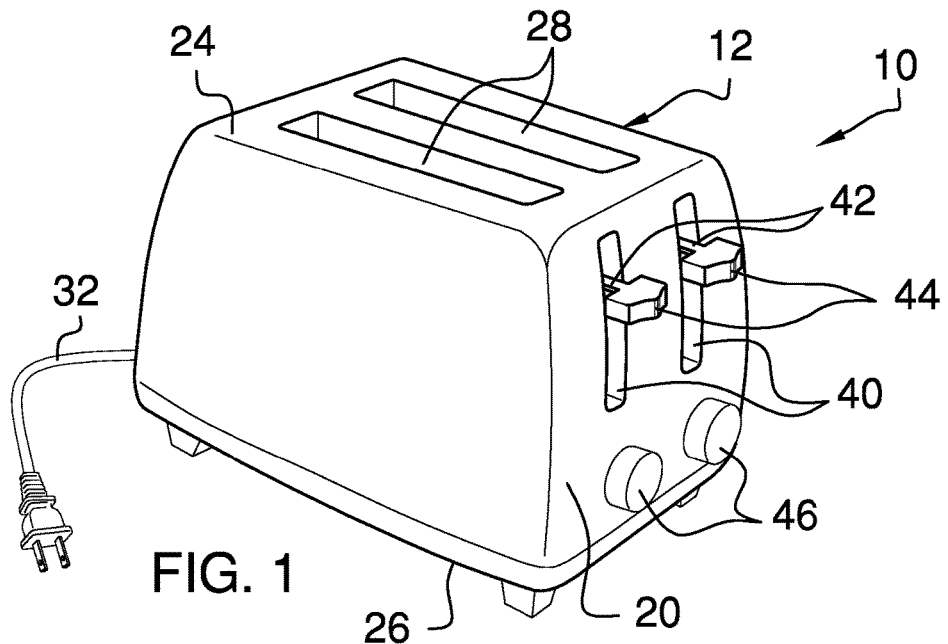
FIG. 1 is an isometric perspective view of a food toasting device according to an embodiment of the disclosure.
Figure 2:
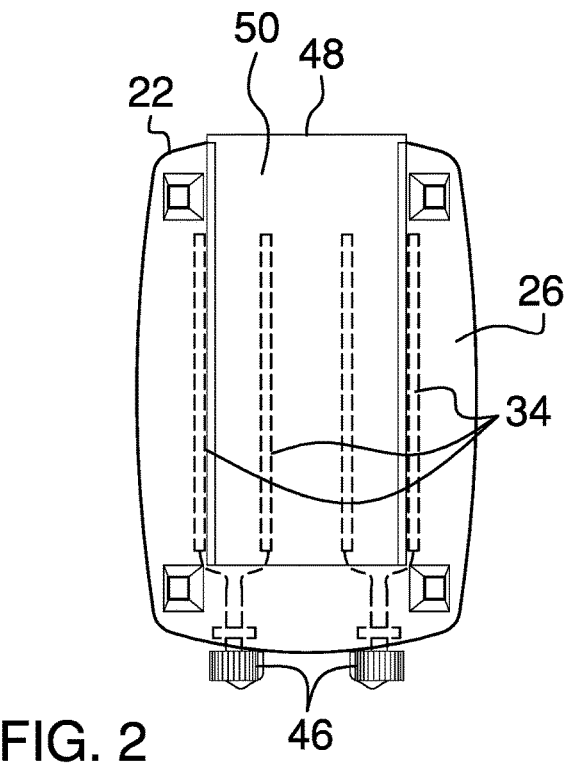
FIG. 2 is a bottom view of an embodiment of the disclosure.
Figure 3:
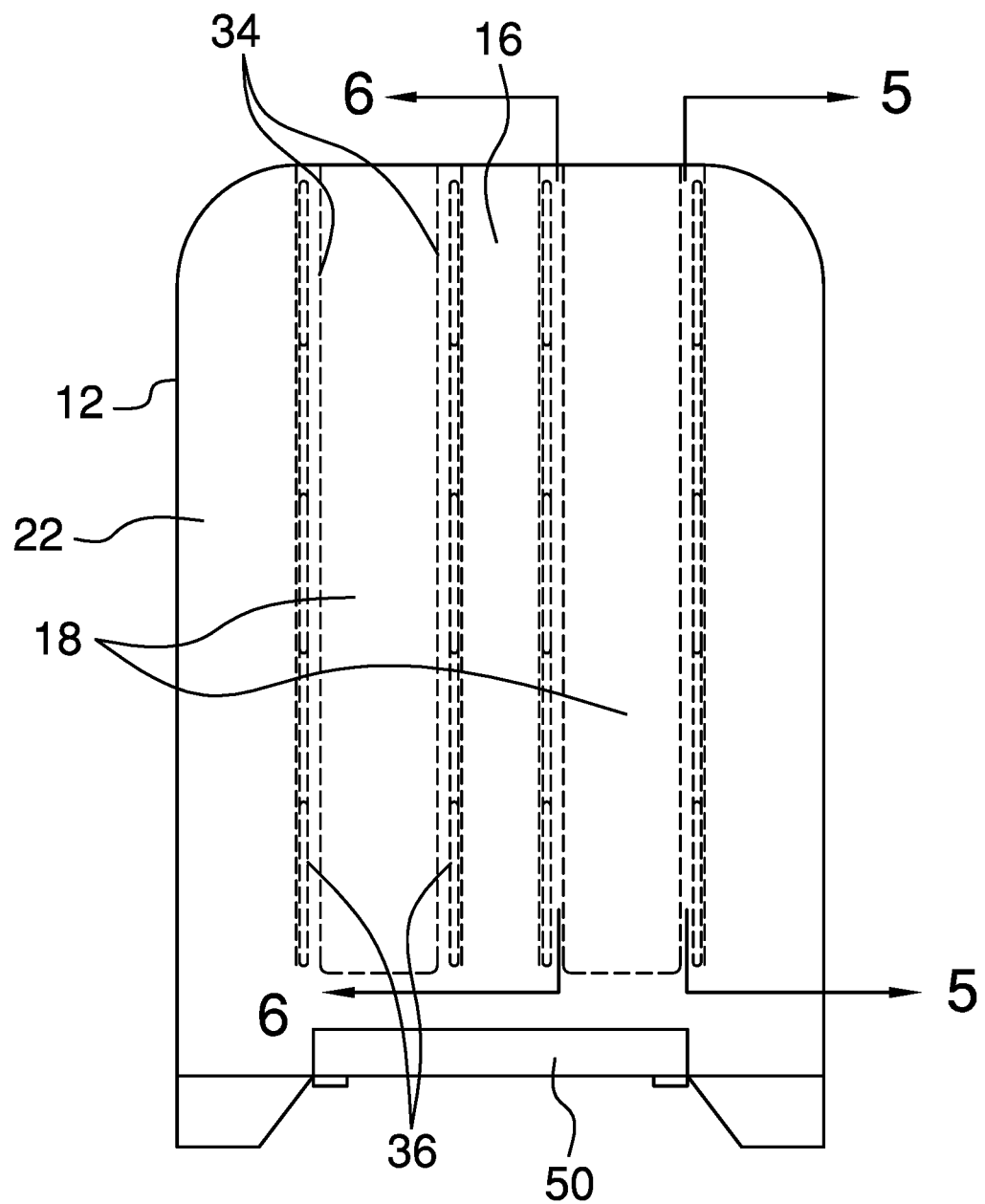
FIG. 3 is a cross-sectional view of an embodiment of the disclosure.
Figure 4:
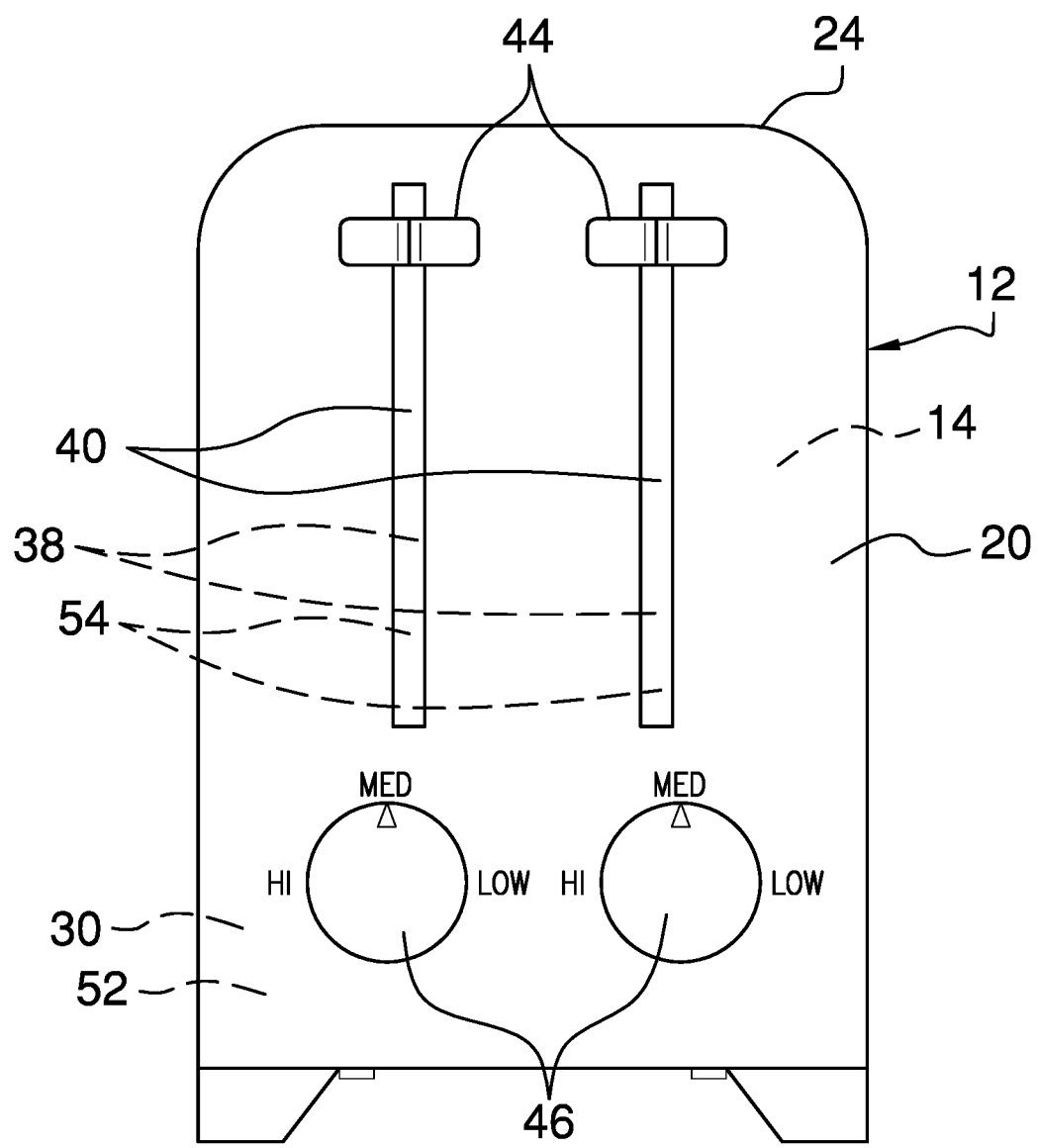
FIG. 4 is a front view of an embodiment of the disclosure.
Figure 5:
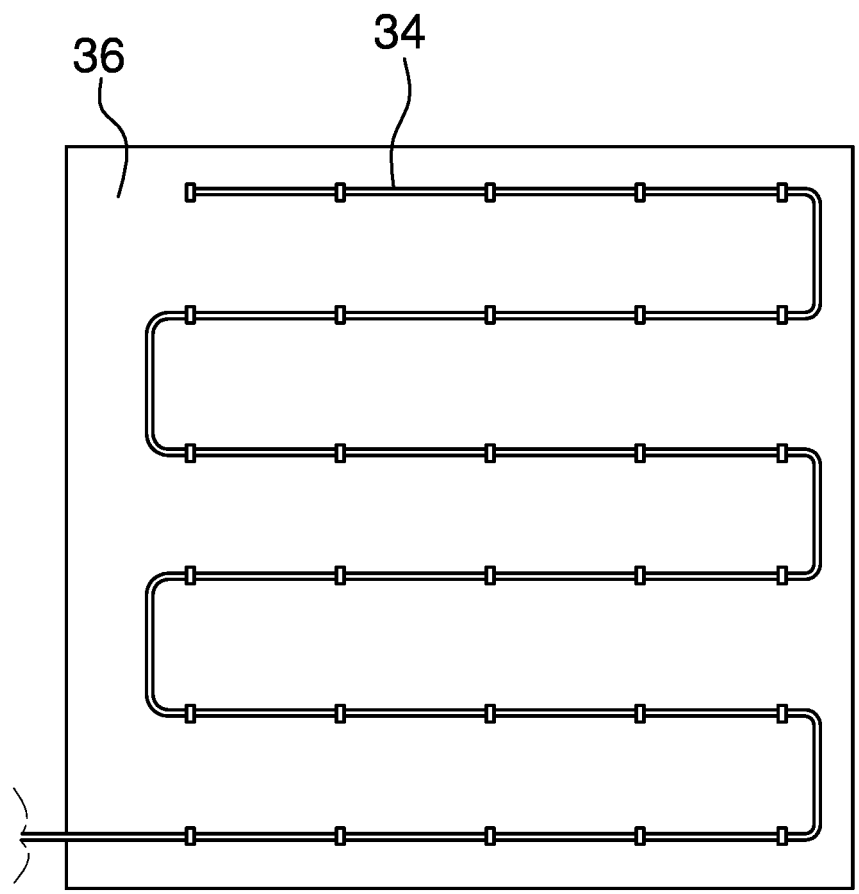
FIG. 5 is a cross-sectional view of an embodiment of the disclosure.

With reference now to the drawings, and in particular to FIGS. 1 through 5 thereof, a new food toasting device embodying the principles and concepts of an embodiment of the disclosure and generally designated by the reference numeral 10 will be described.

As best illustrated in FIGS. 1 through 5, the food toasting device 10 generally comprises a housing 12 that defines an internal space 14. In one embodiment, the housing 12 is substantially rectangularly box shaped.

A plurality of walls 16 is coupled to the housing 12 and is positioned in the internal space 14. The walls 16 define a plurality of chambers 18. In one embodiment, the plurality of walls 16 comprises one wall 16 that defines two chambers 18. The wall 16 extends between a front 20 and a back 22 of the housing 12 and between a top 24 and a bottom 26 of the housing 12.

A plurality of slots 28 is positioned in the top 24 of the housing 12. Each slot 28 is configured to insert a food item, such as a piece of bread, into an associated chamber 18. In one embodiment, the slots 28 are substantially rectangularly shaped.

A power module 30 is coupled to the housing 12 and is positioned in the internal space 14. In one embodiment, the power module 30 comprises a power cord 32 that is coupled to and extends from the housing 12. The power cord 32 is configured to couple to a source of alternating current.

The device 10 comprises a plurality of heating elements 34. The heating elements 34 are selectively couplable to the power module 30. Each heating element 34 is positioned on a respective opposing side 36 of an associated chamber 18. The heating elements 34 are configured to toast the food item that is positioned in the associated chamber 18.

A plurality of lifts 38 is coupled to the housing 12. The lifts 38 are spring loaded and are configured to operate independently. Each lift 38 is positioned in an associated chamber 18 and is configured to lower the food item into the associated chamber 18. In one embodiment, each lift 38 is positioned to couple the heating elements 34 that are positioned in the associated chamber 18 to the power module 30 when the food item is lowered into the associated chamber 18.

A plurality of slits 40 is positioned in the front 20 of the housing 12. Each slit 40 is fluidically coupled to an associated chamber 18. Each of a plurality of bars 42 is coupled to and extends from a respective lift 38 through an associated slit 40. Each of a plurality of tabs 44 is coupled to a respective bar 42 distal from the lift 38. Each tab 44 is configured to be motivated from proximate to the top 24 to proximate to the bottom 26 of the housing 12 to lower the respective lift 38. The food item that is positioned on the respective lift 38 is positioned in the associated chamber 18.

A plurality of controllers 46 is coupled to the front 20 of the housing 12. Each controller 46 is operationally coupled to the power module 30 and associated heating elements 34. The controller 46 is positioned to adjust the current flowing from the power module 30 to the associated heating elements 34 to control a toasting level of the item that is positioned in the chamber 18.

An opening 48 is positioned in the back 22 proximate to the bottom 26 of the housing 12. A tray 50 is reversibly insertable through the opening 48 into the internal space 14 to position the tray 50 below the plurality of lifts 38. The tray 50 is configured to collect debris that falls from the food items that are positioned in the chambers 18.

In another embodiment of the invention, the plurality of lifts 38 is mutually coupled. The lifts 38 are configured to operate unitarily. In this embodiment, the plurality of controllers 46 comprises one controller 46. The controller 46 is configured to selectively couple the heating elements 34 to the power module 30. A sensor 52 is coupled to the housing 12 and is positioned in the internal space 14. The sensor 52 is operationally coupled to the controller 46. The sensor 52 is configured to detect the positioning of the food items into the chambers 18. The sensor 52 is positioned to signal the controller 46. The controller 46 is positioned to selectively couple the power module 30 to the heating elements 34 that are positioned in the chambers 18 that contain the food items. The chambers 18 that do not contain the food items are unheated. In yet another embodiment, the sensor 52 comprises a plurality of detectors 54. Each detector 54 is positioned in an associated chamber 18.

In use, each slot 28 configured to insert the food item, such as the piece of bread, into the associated chamber 18. Each tab 44 is configured to be motivated from proximate to the top 24 to proximate to the bottom 26 of the housing 12 to lower the respective lift 38. The food item that is positioned on the respective lift 38 is positioned in the associated chamber 18. The lift 38 is positioned to couple the heating elements 34 that are positioned in the associated chamber 18 to the power module 30 when the food item is lowered into the associated chamber 18. The heating elements 34 are configured to toast the food item that is positioned in the associated chamber 18. The controller 46 is positioned to adjust the current that flows from the power module 30 to the associated heating elements 34 to control the toasting level of the food item is positioned in the associated chamber 18. The tray 50 is configured to collect the debris that falls from the food items that are positioned in the chambers 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that food items following the word are included, but food items not specifically mentioned are not excluded. A reference to an element by the indefinite article "a" does not exclude the possibility that more than one of the element is present, unless the context clearly requires that there be only one of the elements.

I claim:

1. A food toasting device comprising:
   a housing defining an internal space;
   a plurality of walls coupled to said housing and positioned in said internal space defining a plurality of chambers;
   a plurality of slots positioned in a top of said housing;
   a power module coupled to said housing and positioned in said internal space;
   a plurality of heating elements, said heating elements being selectively couplable to said power module, each said heating element being positioned on a respective opposing side of an associated said chamber;
   a plurality of lifts coupled to said housing, said lifts being spring loaded and configured for independent operation, each said lift being positioned in an associated said chamber;
   wherein each said slot is positioned in said top such that said slot is configured for inserting a food item, such as a piece of bread, into an associated said chamber, wherein said lift is positioned in said associated said chamber such that said lift is configured for lowering the food item into said associated said chamber, wherein said heating elements are positioned in said associated said chamber such that said heating elements are configured for toasting the food item positioned in said associated said chamber;
   a plurality of controllers coupled to said front of said housing, each said controller being operationally coupled to said power module and associated said heating elements such that said controller is positioned for adjusting the current flowing from said power module to said associated said heating elements for controlling a toasting level of the food item positioned in said chamber;
   said plurality of lifts being mutually coupled such that said lifts are configured for unit operation;
   said plurality of controllers comprising one said controller, said controller being configured for selectively coupling said heating elements to said power module;
   a sensor coupled to said housing and positioned in said internal space, said sensor being operationally coupled to said controller, said sensor being configured for detecting positioning of the food items into said chambers; and
   wherein said sensor is positioned for signaling said controller such that said controller is positioned for selectively coupling said power module to said heating elements positioned in said chambers containing food items, such that said chambers not containing food items are unheated.

2. The device of claim 1, further including said housing being substantially rectangularly box shaped.

3. The device of claim 1, further including said plurality of walls comprising one said wall defining two said chambers, said wall extending between a front and a back of said housing and between said top and a bottom of said housing.

4. The device of claim 1, further including said slots being substantially rectangularly shaped.

5. The device of claim 1, further including said power module comprising a power cord coupled to and extending from said housing, said power cord being configured for coupling to a source of alternating current.

6. The device of claim 1, further including each said lift being positioned for coupling said heating elements positioned in said associated said chamber to said power module when the food item is lowered into said associated said chamber.

7. The device of claim 1, further comprising:
a plurality of slits positioned in said front of said housing such that each said slit is fluidically coupled to an associated said chamber;
a plurality of bars, each said bar being coupled to and extending from a respective said lift through an associated said slit;
a plurality of tabs, each said tab being coupled to a respective said bar distal from said lift; and
wherein each said tab is positioned on said respective said bar such that said tab is configured for motivating from proximate to said top to proximate to said bottom of said housing for lowering said respective said lift such that the food item positioned on said respective said lift is positioned in said associated said chamber.

8. The device of claim 1, further comprising:
an opening positioned in said back proximate to said bottom of said housing;
a tray reversibly insertable through said opening into said internal space positioning said tray below said plurality of lifts; and
wherein said tray is positioned in said internal space such that said tray is configured for collecting debris falling from the food items positioned in said chambers.

9. The device of claim 1, further including said sensor comprising a plurality of detectors, each said detector being positioned in an associated said chamber.

10. A food toasting device comprising:
a housing defining an internal space, said housing being substantially rectangularly box shaped;
a plurality of walls coupled to said housing and positioned in said internal space defining a plurality of chambers, said plurality of walls comprising one said wall defining two said chambers, said wall extending between a front and a back of said housing and between a top and a bottom of said housing;
a plurality of slots positioned in said top of said housing, wherein each said slot is positioned in said top such that said slot is configured for inserting a food item, such as a piece of bread, into an associated said chamber, said slots being substantially rectangularly shaped;
a power module coupled to said housing and positioned in said internal space, said power module comprising a power cord coupled to and extending from said housing, said power cord being configured for coupling to a source of alternating current;
a plurality of heating elements, said heating elements being selectively couplable to said power module, each said heating element being positioned on a respective opposing side of an associated said chamber, wherein said heating elements are positioned in said associated said chamber such that said heating elements are configured for toasting the food item positioned in said associated said chamber;
a plurality of lifts coupled to said housing, said lifts being spring loaded and configured for independent operation, each said lift being positioned in an associated said chamber, wherein said lift is positioned in said associated said chamber such that said lift is configured for lowering the food item into said associated said chamber, each said lift being positioned for coupling said heating elements positioned in said associated said chamber to said power module when the food item is lowered into said associated said chamber;
a plurality of slits positioned in said front of said housing such that each said slit is fluidically coupled to an associated said chamber;
a plurality of bars, each said bar being coupled to and extending from a respective said lift through an associated said slit;
a plurality of tabs, each said tab being coupled to a respective said bar distal from said lift, wherein each said tab is positioned on said respective said bar such that said tab is configured for motivating from proximate to said top to proximate to said bottom of said housing for lowering said respective said lift such that the food item positioned on said respective said lift is positioned in said associated said chamber;
a plurality of controllers coupled to said front of said housing, each said controller being operationally coupled to said power module and associated said heating elements such that said controller is positioned for adjusting the current flowing from said power module to said associated said heating elements for controlling a toasting level of the food item positioned in said chamber;
an opening positioned in said back proximate to said bottom of said housing;
a tray reversibly insertable through said opening into said internal space positioning said tray below said plurality of lifts, wherein said tray is positioned in said internal space such that said tray is configured for collecting debris falling from the food items positioned in said chambers; and
wherein each said slot is positioned in said top such that said slot is configured for inserting the food item, such as the piece of bread, into an associated said chamber, wherein each said tab is positioned on said respective said bar such that said tab is configured for motivating from proximate to said top to proximate to said bottom of said housing for lowering said respective said lift such that the food item positioned on said respective said lift is positioned in said associated said chamber, wherein said lift is positioned for coupling said heating elements positioned in said associated said chamber to said power module when the food item is lowered into said associated said chamber, wherein said heating elements are positioned in said associated said chamber such that said heating elements are configured for toasting the food item positioned in said associated said chamber, wherein said controller is positioned for adjusting the current flowing from said power module to said associated said heating elements for controlling the toasting level of the food item positioned in said associated said chamber, wherein said tray is positioned in said internal space such that said tray is configured for collecting the debris falling from the food items positioned in said chambers;

said plurality of lifts being mutually coupled such that said lifts are configured for unit operation;

said plurality of controllers comprising one said controller, said controller being configured for selectively coupling said heating elements to said power module;

a sensor coupled to said housing and positioned in said internal space, said sensor being operationally coupled to said controller, said sensor being configured for detecting positioning of the food items into said chambers; and wherein said sensor is positioned for signaling said controller such that said controller is positioned for selectively coupling said power module to said heating elements positioned in said chambers containing food items, such that said chambers not containing food items are unheated, said sensor comprising a plurality of detectors, each said detector being positioned in an associated said chamber.

* * * * *